US009888030B2

(12) United States Patent
Yao et al.

(10) Patent No.: US 9,888,030 B2
(45) Date of Patent: Feb. 6, 2018

(54) DETECTION OF STEALTHY MALWARE ACTIVITIES WITH TRAFFIC CAUSALITY AND SCALABLE TRIGGERING RELATION DISCOVERY

(71) Applicants: Danfeng Yao, Blacksburg, VA (US); Hao Zhang, Blacksburg, VA (US)

(72) Inventors: Danfeng Yao, Blacksburg, VA (US); Hao Zhang, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 0 days.

(21) Appl. No.: 14/267,422

(22) Filed: May 1, 2014

(65) Prior Publication Data

US 2014/0310808 A1 Oct. 16, 2014

Related U.S. Application Data

(63) Continuation of application No. 13/255,567, filed as application No. PCT/US2010/027260 on Mar. 13, 2010, now Pat. No. 8,763,127.

(60) Provisional application No. 61/210,097, filed on Mar. 13, 2009.

(51) Int. Cl.
*H04L 29/06* (2006.01)
*G06F 21/31* (2013.01)
*G06F 21/32* (2013.01)
*G06F 21/56* (2013.01)

(52) U.S. Cl.
CPC .......... *H04L 63/145* (2013.01); *G06F 21/316* (2013.01); *G06F 21/32* (2013.01); *G06F 21/566* (2013.01); *G06F 2221/2133* (2013.01)

(58) Field of Classification Search
CPC ... H04L 63/145; H04L 63/1441; G06F 21/50; G06F 21/56; G06F 21/567; G06F 21/00; G06F 2221/2133
See application file for complete search history.

(56) References Cited

U.S. PATENT DOCUMENTS

| 8,631,485 | B2* | 1/2014 | Ollmann ........................ 726/16 |
| 8,818,927 | B2* | 8/2014 | Ruf ....................... H04L 43/028 706/47 |
| 9,069,964 | B2* | 6/2015 | Ollmann ............... G06F 21/554 |
| 2007/0136783 | A1* | 6/2007 | Shelest ............... H04L 63/1408 726/1 |
| 2008/0065572 | A1* | 3/2008 | Abe et al. ....................... 706/14 |
| 2009/0143144 | A1* | 6/2009 | Schluessler et al. ........... 463/42 |
| 2010/0162393 | A1* | 6/2010 | Sobel .................... G06F 21/554 726/23 |

* cited by examiner

*Primary Examiner* — Saleh Najjar
*Assistant Examiner* — Devin Almeida
(74) *Attorney, Agent, or Firm* — Keith A. Vogt; Vogt IP

(57) ABSTRACT

A computer system for distinguishing user-initiated network traffic from malware-initiated network traffic comprising at least one central processing unit (CPU) and a memory communicatively coupled to the CPU. The memory includes a program code executable by the CPU to monitor individual network events to determine for an individual network event whether the event has a legitimate root-trigger. Malware-initiated traffic is identified as an individual network event that does not have a legitimate root-trigger.

19 Claims, 6 Drawing Sheets

DETECTION OF STEALTHY MALWARE ACTIVITIES WITH TRAFFIC CAUSALITY AND SCALABLE TRIGGERING RELATION DISCOVERY

CROSS-REFERENCE TO RELATED APPLICATIONS

This application is a continuation in part of U.S. Ser. No. 13/255,567 filed Sep. 9, 2011, which is a 371 of International Application No. PCT/US2010/027260 filed Mar. 13, 2010 which claims the benefit of U.S. Provisional Application 61/210,097, filed on Mar. 13, 2009, which are all incorporated herein by reference in their entirety.

STATEMENT REGARDING FEDERALLY SPONSORED RESEARCH OR DEVELOPMENT

This invention was made with government support under Grant No. CNS0951638 awarded by the National Science Foundation. The government has certain rights in the invention.

INCORPORATION-BY-REFERENCE OF MATERIAL SUBMITTED ON A COMPACT DISC

Not Applicable.

BACKGROUND OF THE INVENTION

Field of the Invention

Studies show that it is not uncommon for networked computers to be infected with stealthy malware. For example, it is estimated that a significant portion (>25%) of computers worldwide are infected with malware conducting clandestine activities. Infection allows remote attackers to control, utilize, or spy on victim machines. Malware may spy on the victim user (e.g., stealing passwords such as in Pony botnet, tracking the user's activities, data exfiltration), and abuse the computer for conducting bot activities (e.g., command-and-control, launching attacks from it). As a result, stealthy malicious software poses serious threats to the security of networked computers and data.

Determining whether or not networked hosts are infected with stealthy malware is technically challenging. Virtually all malware activities require sending outbound network traffic from the infected machine. However, because of the low traffic volume of stealthy malware, frequency-based statistical anomaly detection is not effective. HTTP and DNS have been widely observed as the protocols for malware and botnet communications, as they are rarely blocked by firewalls.

Conventional signature-scan or counting-based techniques that are used to prevent attacks are limited, as they are unable to stop new zero-day exploits. The initial infection vector of most malware is usually through exploiting vulnerabilities of common networked software, e.g., heap overflow vulnerability in web browser or its plug-ins. Once the infection is successful (e.g., zero-day exploits), network requests from advanced malware may not exhibit distinct communication patterns. Because of this lack of signatures, pattern-based scanning is ineffective.

Other approaches focus on characteristic behavioral patterns in network event attributes. For example, BINDER detects anomalous network activities on personal computers by analyzing the correlation in traffic events by the temporal and process information. BotMiner showed the effectiveness of correlation analysis across multiple hosts of a network in detecting similarly infected bots. Other approaches construct directed graphs from logs to show network connections for dissecting attack sequences. However, none of these above solutions is designed for detecting general stealthy malware activities. Thus, they cannot be directly applied to solve the problem.

Nor have there been systematic studies on network-request-level causal analysis for malware detection. Existing dependency analysis work is on network service level and is not designed for malware detection. For example, several approaches address the problem of network application/service dependency for network stability and automatic manageability. Another approach actively perturbs or delays traffic to understand the dependencies between service and devices. These approaches do not achieve liner granularity (request vs. flow) which requires different relation semantics and more scalable analysis methods. The existing binary classification solutions designed for JavaScript analysis and malware detection cannot be directly applied to the triggering relation discovery problem which the present invention addresses.

BRIEF SUMMARY OF THE INVENTION

Triggering relations of events provide contextual interpretations for the behaviors of systems and networks, illustrating why sequences of events occur and how they relate to each other. Because of the transitivity, the problem of discovering triggering relations among a set of events may be transformed into discovering the triggering relations of pairs of events, which is defined as the pairwise triggering relation.

In one embodiment, the present invention provides an approach that efficiently discovers the underlying triggering relations of a massive amount of network events. It uses triggering relations to reason the occurrences of network events and to pinpoint stealthy malware activities. The invention defines a new problem of triggering relation discovery of network events. The solution provided is based on domain-knowledge guided advanced learning algorithms. Experimental evaluation involving 6+ GB traffic of various types establishes the accuracy of the triggering relation discovery of the present invention.

In another embodiment, the present invention concerns the problem of triggering relation discovery in network traffic and provides applications to solve network security problems, such as stealthy malware detection. The invention provides a scalable learning based technique to compute the triggering relations among network events. Discovered triggering relations are used to reason about the legitimacy of observed network activities. Analytical methods are used to detect several types of anomalies including spyware activities, botnet command-and-control traffic, compromised web servers and web server misconfiguration. The accuracy and scalability of the present invention was evaluated with 6+ GB real-world network traffic, including HTTP, DNS, and TCP traffic. Results show that the present invention efficiently predicts pairwise triggering relations with high accuracy.

The present invention uses machine learning, is scalable, and capable of rapidly processing large amount of traffic. Using machine learning algorithms simplifies detection and eliminates the need for manually deriving classification rules. In addition, it achieves very high classification accuracy.

The present invention demonstrates that triggering relations among cyberspace events at all levels can provide structural evidences for system and network assurance. The causality provides the logical interpretation to the vast amount of otherwise structureless and contextless network events. The triggering relation of the present invention differs from the link prediction problem in social networks in that triggering relations are directional, whereas links in social networks are usually not, and link predictions are performed on transaction features or communication features among nodes (e.g., persons, accounts). Furthermore, the solutions provided by the present invention extend beyond the edge prediction problem for network security.

DETAILED DESCRIPTION OF THE INVENTION

This description is not to be taken in a limiting sense, but is made merely for the purpose of illustrating the general principles of the invention. The scope of the invention is defined by the appended claims. In a preferred embodiment, triggering relationships are used to provide network protection and security applications. A triggering relationship, in one embodiment, is a relationship between event $e_i$ and event $e_j$ which describes the temporal relation and causal relation between them; specifically, $e_i$ precedes $e_j$ and $e_i$ is one of the reasons that directly or indirectly triggers or causes $e_j$ to occur. The semantics of a triggering relation may depend on the type of event and environment. An event may be defined as any relevant type or granularity, including user actions (e.g., keyboard stroke, mouse click), machine behaviors (e.g., network request, function call, system call, file system access), and higher-level operations and missions database access, obtaining Kerberos authorization, distributing video to select users).

Triggering relations of events may be represented in directed graph—a triggering relation graph (TRG), where each event may be represented as a node and a directed edge $(e_i \rightarrow e_j)$ from $e_i$ and to $e_j$ which represents the triggering relation. The triggering relation $(e_i \rightarrow e_j)$ may also be the parent-child relation, where $e_i$ is the trigger or parent and $e_j$ is the child. The triggering relation graph may also be constructed by incrementally inserting new events into a graph.

Figure 1A:
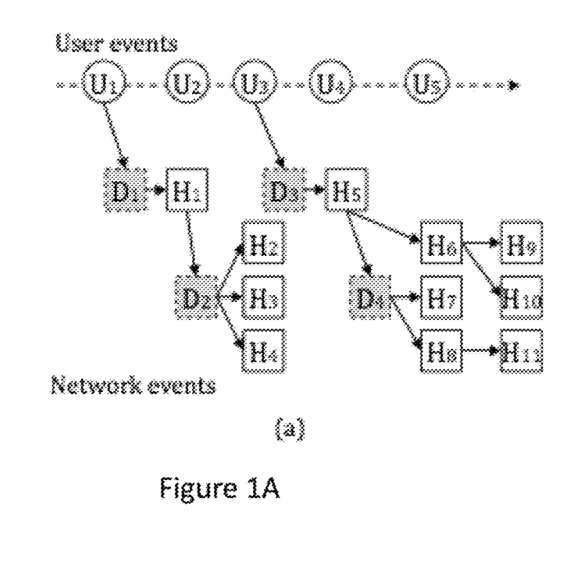
FIG. 1A schematically illustrates triggering relation graphs for outbound traffic from a host.
Figure 1B:
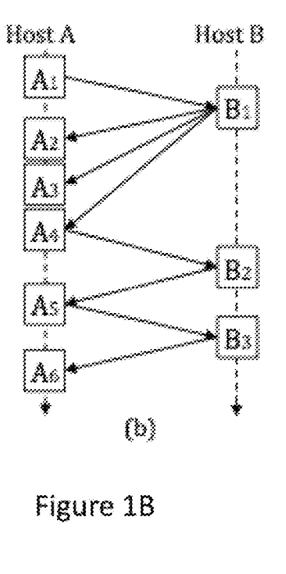
FIG. 1B schematically illustrates traffic between two hosts.

FIGS. 1A and 1B are schematic drawings of triggering relation graphs for outbound traffic from a host (FIG. 1A) and traffic between two hosts (FIG. 1B). In FIG. 1A, the user events (e.g., $U_3$) such as entering as URL into the browser address bar are root triggers, which are followed by DNS queries (e.g., $D_3$) for translating the requested domain names. Then, one or multiple HTTP requests (e.g., $H_S$) are sent to the servers, and additional HTTP requests (e.g., $H_5$) may be triggered to fetch embedded objects. In FIG. 1B, triggering relations in TCP type sessions are shown.

FIGS. 1A and 1B illustrate two TRG examples. For specific types of network traffic, such a TRG may manifest unique topology and properties. For example, for outbound HTTP and DNS traffic from a host, the TRG forms a forest of trees, rooted by user inputs. The user input events are root triggers. Because of the temporal property of events, trigger relation graphs may be free of cycles. This acyclic property makes a TRG different from social network graphs in link prediction problems. In one embodiment, in a valid TRG, a node has one parent and one root trigger. A network triggering relation graph may also be sparse, i.e., the number of neighbors of a node compared to the total numbers of nodes is small.

Figure 2:
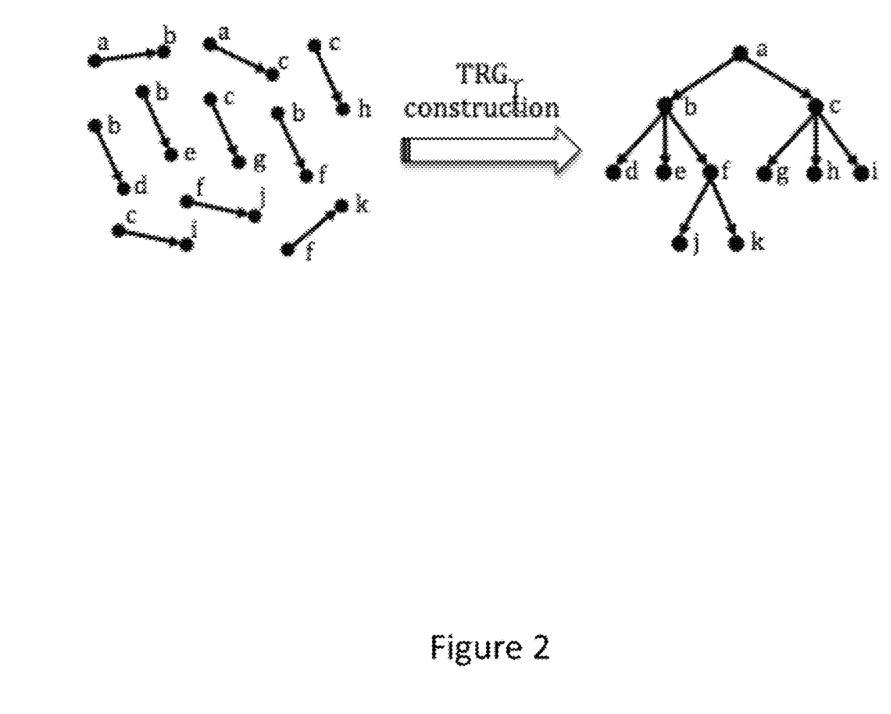
FIG. 2 illustrates the triggering relation graph (TRG) on the right which may be constructed from the pairwise triggering relations on the left.

To construct a triggering relation graph corresponding to the events, the discovery problem is given a set of event nodes, to determine the existence of edges between pairs of the nodes and the directions of the edges. This simplifies the pairwise triggering relation problem, which is to determine whether a triggering relation exists in two events. Given the pairwise triggering relations, a triggering relation graph(s) may be constructed as illustrated by the TRG construction operation shown in FIG. 2. A TRG provides a structural representation of triggering relations of observed events.

By the definition of triggering relation graph, for a preferred embodiment, each node on to valid TRG may have at the most one parent and thus at most one root trigger although other configurations may be used. As a result, the TRG algorithm is constructed to find all the root triggers of to network event, which makes the problem equivalent to computing the transitive reduction of a direct graph.

Figure 4:
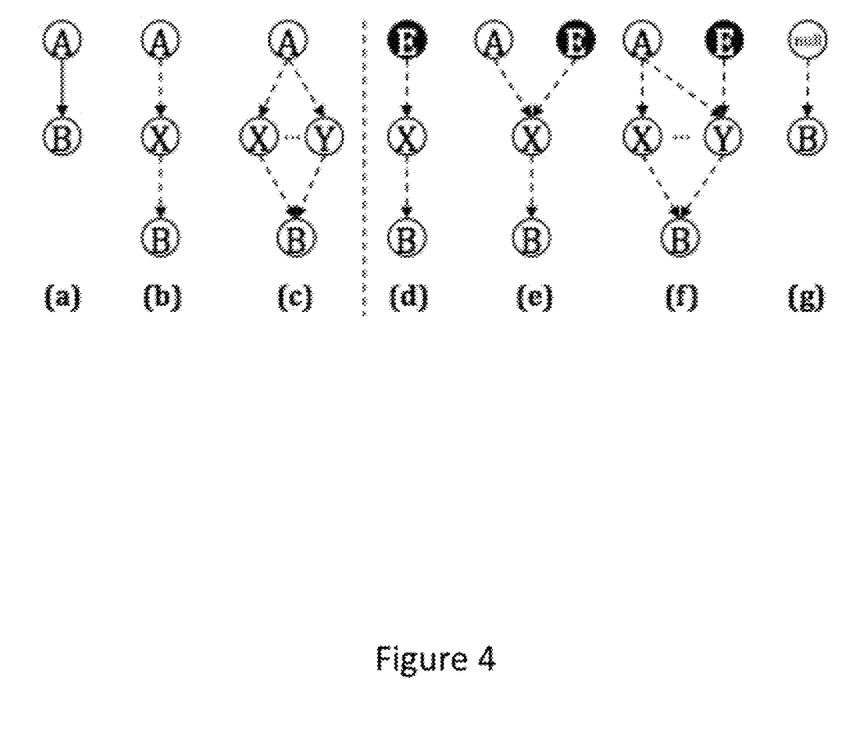
FIG. 4 illustrates various cases where B's predicted root trigger is correct (a-c) or wrong (d-g) on the triggering relation graph constructed from pairwise triggering relations.

The illustration of FIG. 4 shows various cases where B's predicted toot trigger is correct (a-c) or wrong (d-g) on the triggering relation graph constructed from pairwise triggering relations. Let the ground troth of B's root trigger be A. Case (a) is where B's parent is also B's root. Cases (b) and (c) are where there is one or more paths from the single root A to B, respectively. Cases (d), (e), and (f) are where the predicted root of B is null, i.e., no root trigger. Using a root-trigger definition allows the existence of multiple intermediate parents for a node, as long as the root trigger is correct, e.g., FIG. 4.

The event-level causal relation used by an embodiment of the invention relates to, but differs from the service dependency definition in existing service dependency research, such as network service dependency and active delay injection. Service dependency refers to a single service that relies on another to function, e.g., web service depends on DNS name resolution. The event-level causal relation used by an embodiment of the invention refers to an occurrence where one event triggers or causes the other event, e.g., the transmission of one network packet triggers the transmission of the other packet.

The TRG differs from both the parental dependency graphs in WebProphet and program dependency graphs in terms of graph semantics and security applications. Parental dependency graphs typically contain timing information only, without capturing the causality among requests or objects. The graphs in WehProphet predict the performance impact of webpage objects, while the TRG detects anomalous network events. In program dependency graphs, nodes represent Java packages, and edges denote interactions or dependencies (e.g., inheritance, method calls, etc.). As a result, all three graphs differ in their security applications.

two network requests P and Q with P occurring before Q, one needs to decide whether P triggers Q, i.e., P→Q. An approach for triggering relation discovery is rule-based classification. One or more rules summarizing the attribute properties of two parent-child requests may be defined. An exemplary rule may be as follows, with attribute names described in Table 1 below: If P.time≤Q.time ∧ P.PID=Q.PID ∧ P.host=Q.referrer, the P is the parent trigger of Q, i.e., P→Q.

TABLE 1

Original network events observed. Time, Q Type, R Type, and Parent ID stands for timestamp, request type, referrer type, and the ID of its parent event. The source IP of network events in this example is the same, while the source ports may differ (not shown).

| ID | Time | PID | DestAddr | Request (Q) | Host | Referrer (R) | Q Type | R Type | Parent ID |
|---|---|---|---|---|---|---|---|---|---|
| ... | | | | | | | | | |
| 4 | 22.723 | 2724 | 64.30.224.103.80 | / | www.cnet.com | NA | web | NULL | 0 |
| 5 | 22.733 | 2724 | 198.82.164.40.80 | .../combined.js | i.i.com.com | www.cnet.com | js | web | 4 |
| 6 | 22.973 | 2724 | 198.82.164.40.80 | .../matrix.css | i.i.com.com | www.cnet.com/ | css | web | 4 |
| ... | | | | | | | | | |
| 14 | 25.307 | 2724 | 198.82.164.40.80 | .../bgBody.gif | i.i.com.com | .../matrix.css | media | css | 6 |
| ... | | | | | | | | | |

In a preferred embodiment, network requests on TRG without valid root triggers are referred to as vagabond requests. They are typically anomalous events without legitimate causal relations, and likely due to stealthy malware activities. The definition of root triggers may vary. For user-intention based triggering models, root triggers are user-input actions. The analysis pinpoints network activities that are not intended by users. Blocking these outbound malware network activities effectively isolates the malware, including: websites collecting and reporting sensitive user data, affecting user privacy; spyware exfiltrating sensitive information through outbound network traffic from the monitored host; and bots' command-and-control traffic, and attack activities (e.g., spam or DoS traffic) originated from the monitored host.

An exemplary scenario for using an embodiment of the invention to detect stealthy outbound malware activities on a host may be as follows. DNS tunneling has been abused by botnets for command and control communications. These abnormal outbound DNS queries are automatically generated by malware on the host, typically with botnet-related payload. These surreptitious DNS activities are difficult to detect, because of their format resemblance to regular DNS queries. The present invention reasons about the legitimacy of observed DNS traffic on a possibly infected host. Legitimate DNS queries are usually issued by an application (e.g., browser) upon receiving certain user inputs (e.g., entering a URL into the address bar). The application then issues additional DNS or other requests (e.g., HTTP, FTP). Botnet DNS queries lack any matching user triggers. Vagabond events are detected and reported.

To maintain data integrity, application-level malicious events may be considered, so the kernel-level system data (e.g., keyboard and mouse events) are assumed to be trustworthy. To prevent the forgery of user's events, advanced keystroke integrity solutions may be incorporated to enhance system-data assurance.

The methods described below infer the triggering relation among network requests to construct triggering relation graphs. The analysis may automatically pinpoint the occurrences of anomalous network requests from voluminous traffic data, through reasoning triggering relations. Given However, the rule-based approach has several drawbacks that hinder its scalability and accuracy. It requires manual rule specification, which is time consuming. The rigid rule structures are not flexible enough to recognize complex traffic scenarios, resulting in low classification accuracy and false alarms. Accordingly, in another embodiment, the present invention utilizes probabilistic machine learning algorithms to increase scalability and detection accuracy. A scalable feature extraction method that may be used is Pairing. This operation converts individual network events into event pairs, which may consist of two or more events, with comparable pairwise attributes, which allow for the use of binary classification algorithms for triggering relation discovery.

Operations that may be considered include, but are not limited to, DATA COLLECTION, PAIRING, DATA LABELING, TRAINING, CLASSIFICATION, TRG CONSTRUCTION, and REPORT. The DATA LABELING AND TRAINING and CLASSIFICATION operations are standard for machine learning based methods. The new operations are PAIRING and TRG CONSTRUCTION. DATA COLLECTION is to record and store the events to be analyzed. Each event e has one or more attributes $(A_1, \ldots, A_m)$, describing its properties. PAIRING is an operation for extracting pairwise comparison results (i.e., features) of events' attributes. Its inputs are two events $e=(A_1, \ldots, A_m)$ and $e'=(A'_1, \ldots, A'_m)$ The output is the event pair (e, e') with m pairwise attribute values $(B_1, \ldots, B_m)$, where a pairwise attribute $B_i (i \in [1, m])$ represents the comparison result of attributes $A_i$ and $A'_i$. That is, $B_i = f_i(A_i, A'_i)$, where $f_i( )$ is a comparison function for the type of the i-th attribute in the events. The comparison function $f_i( )$ (e.g., isEqual, isGreaterThan, isWithinThreshold, isSubstring, etc.) is chosen based on the type of attribute. The feature construction can be extended to comparing different traffic types. Pairing is performed on every two events that may have the parent-child triggering relation. To reduce the complexity of the analysis, a heuristic that may be used is to pair up events whose timestamps are close. Another efficient pairing algorithm that may be used to reduce the cost of pairing without compromising the analysis accuracy as set forth below. The pairwise features are used as inputs to the subsequent learning algorithms.

DATA LABELING is the operation that produces the correct triggering relations for the event pairs in a (small) training dataset. A binary label (1 or 0) indicates the existence or nonexistence of any triggering relation in an event pair, e.g., <(e, e'), 1> represents that event e triggers e'. Data labeling is based on pairwise attributes (e.g., ($B_1$, ..., $B_m$), and may require manual efforts.

TRAINING is the operation that produces a machine learning model with labeled training data.

CLASSIFICATION is the operation used with the trained machine learning model to predict triggering relations on new event pairs $\{P_{ij}=(e_i, e_j)\}$. E.g., the outputs of binary prediction results are in the form of $\{<P_{ij}, I_{ij}>\}$, where the binary classification result $l_{ij} \in \{0, 1\}$ represents whether event $e_i$ triggers $e_j$ in the pair $P_{ij}$.

TRG CONSTRUCTION is the operation to construct the complete triggering relation graph based on pairwise classification results. If event $e_i$ triggers $e_j$ in the pair $P_{ij}$, then $e_i$ is the parent of $e_j$ in the TRG.

REPORT is the operation used to apply security definitions to the triggering relation graph and report anomalous events. A user-intention based security definition for TRG analysis is discussed below.

The PAIRING operation is a feature extraction operation that enables the use of binary classifications for pairwise directional relation discovery. The PAIRING operation extracts features of event pairs. Pairwise attributes ($B_1$, ..., $B_m$), are computed by comparing the attribute values ($A_1$, ..., $A_m$) and ($A'_1$, ..., $A'_m$) of two individual events e and e'. A comparison function $f_i(A_i, A'_i)$ for $i \in [1, m]$ is selected based on the type of attributes $A_i$ and $A'_i$. An event attribute may include, but is not limited to, the numeric, nominal, string/text, or composite type. After the pairwise feature extraction, one or more binary classification algorithms may be used for classification. The classification requires labeled pairs for training, where triggering relations among events (i.e., labels) are known. For test data, triggering relations are unknown and need to be predicted.

One exemplary paining procedure that may be used concerns outbound HTTP network events. The approach can be generalized to other event types and examples of possible HTTP events are indicted in Table 1. Other events may also be used with the teachings of the invention and the contents of Table 1 illustrate just one implementation of the invention.

The triggering relations, if known, are shown in the last column (under ParentID). Six event pairs are generated and their new pairwise attributes are shown in Table 2 below.

butes (e.g., timestamps) are compared by computing their differences, e.g., the interval TimeDiff between the timestamps of two network events. That is, $B_i = A_i - A'_i$. A nominal attribute (e.g., file type, protocol type) categorizes the property of an event. Comparing nominal attributes usually involves string comparison, e.g., sub-string or equality tests. For the string type of attributes, the similarity of the attribute values is computed as the pairing attribute value. That is, $B_i = f_s(A_i, A'_i)$, where function $f_s$ is a similarity measure, e.g., normalized edit distance.

For example, pair attributes HostSim and ReferrerSim are computed by measuring the string similarities between two host fields and two referrer fields, respectively. A composite attribute is converted to primitive types, e.g., a destination address containing four octets for the IP address and an integer for the port. The comparison of the two composite attribute values is made by comparing the sub-attribute values separately. Given a list of n network events, the total number of event-pair candidates is hounded by $O(n^2)$. To reduce the computational cost, events that occur within a certain time frame τ may be paired up, assuming that events occurring far apart are unlikely to have triggering relations.

A pairing algorithm that pre-screens attributes to quickly eliminate unqualified pair candidates may also be used. The algorithm uses a dictionary D={(key, value)} to store the current network events. These events may be the parent triggers of future events. The key of the dictionary is the domain attribute of an event. The value is a set of requests, whose domain attribute is the same as the key. Events with unmatched key values are filtered out (in Screening function of Algorithm 1), and not stored or paired, reducing both storage and computation overheads. As a result, a much longer time can be used to retire at domain, providing a more comprehensive coverage on pairs. The pseudo-code of a suitable algorithm is shown below. It takes a list of chronologically sorted network requests as the input and outputs a set of pairs of events.

| Algorithm 1 Efficient Pairing Algorithm (EPA) |
| --- |
| Input: a list of chronological sorted events, L = $\{e_i\}$ |
| Output: a set of event pairs, P = $\{(e_i, e_j)\}$, $1 \le i < j$ |
| 1:    define a set P to store the compared pairs $\{(e_i, e_j)\}$ |
| 2:    define a dictionary D = (d, {e}), where d is the domain of event and {e} is a set of events whose domain is d. |
| 3:    for each event $e_i \in L$ do |
| 4:       d ← the domain of $e_i$'s Host |
| 5:       if $e_i$'s Referrer is not NULL then |
| 6:          dom ← the domain of $e_i$'s Referrer |

TABLE 2

Examples of pairwise attributes as outputs of the Pairing operation. Q1 and R2 stand for the first event's request type and the second event's referrer type, respectively.

| (ID1, ID2) | TimeDiff | PIDDiff | AddrDiff | RequestSim | HostSim | ReferrerSim | Q1 | R2 | Relation |
| --- | --- | --- | --- | --- | --- | --- | --- | --- | --- |
| (4, 5) | 0.01 | 1 | 1111000001 | 1 | 0.5 | 0 | web | web | 1 |
| (4, 6) | 0.25 | 1 | 1111000001 | 1 | 0.5 | 0 | web | web | 1 |
| (4, 14) | 2.584 | 1 | 1111000001 | 0.1667 | 0.5 | 0 | web | css | 0 |
| (5, 6) | 0.24 | 1 | 1111111111 | 0.1356 | 1 | 1 | js | web | 0 |
| (5, 14) | 2.574 | 1 | 1111111111 | 0.5593 | 1 | 0.5 | js | css | 0 |
| (6, 14) | 2.334 | 1 | 1111111111 | 1 | 1 | 0.5 | css | css | 1 |

For example, the HostSim, ReferrerSim and RequestSim give the similarity of two events in Host, Referrer and Request attributes, respectively, according to certain similarity measures. Each pair has a binary representation of the existence of a triggering relation (under Relation in Table 2). The pairing details are illustrated as follows. Numeric attri- -continued

| Algorithm 1 Efficient Pairing Algorithm (EPA) |
| --- |
| 7:       else |
| 8:          dom ← d |

| Algorithm 1 Efficient Pairing Algorithm (EPA) | |
| --- | --- |
| 9: | end if |
| 10: | if dom in D's keyset then |
| 11: |    for each event $e_j$ in D[dom] do |
| 12: |       if pass the Screening($e_i$, $e_j$) then |
| 13: |          P ← P ∪ Pairing($e_i$, $e_j$) |
| 14: |       end if |
| 15: |    end for |
| 16: |    calculate the expire time and update D[d] |
| 17: |    add $e_j$ in D[d] |
| 18: | else |
| 19: |    add new entry (d, [$e_j$]) in D |
| 20: | end if |
| 21: | end for |
| 22: | return P |

Feature selection is a method that may be used to find an optimal set of representative feature which can greatly improve the effectiveness of machine learning classifiers. Different feature selection algorithms that may be used are Information Gain and Gain Ratio. Once a set of features is chosen, the data may be trained and classified using three common supervised machine-learning classifiers—Naive Bayes, a Bayesian network, and a support vector machine (SVM). Cost Sensitive classifiers may also be used because of the sparsity of triggering relations Customized cost matrices may be defined to penalize missed relations during the training. The cost matrix can be defined to weigh the false positive (FP) and false negative (FN) differently. A false negative refers to the failure to discover a triggering relation. A false positive means finding triggering relation in a non-related pair. Table 3 set forth below provides an exemplary cost matrix for classifying triggering relation labeled by two categories: with triggering relation and without triggering relation.

TABLE 3

Semantics of values in a cost matrix. TR stands for triggering relation.

| | Classified As | |
| --- | --- | --- |
| | W/O TR | With TR |
| Ground Truth W/O TR | TN: No penalty. | FP: penalty for finding triggering relations in non-related pairs. |
| With TR | FN: penalty for failure to discover triggering relations. | TP: No penalty. |

The values in the matrix are the weights for penalizing classification mistakes. Positive values are set in the cells for FN and FP. The cost sensitive classification takes a cost matrix as an input. The trained model aims at minimizing the total penalty in imbalanced data sets. For example, $$\begin{vmatrix} 0 & 1 \\ 1 & 0 \end{vmatrix}$$

is a cost matrix that has no bias for false positives a id false negatives, while a cost matrix of $$\begin{vmatrix} 0 & 1 \\ 10 & 0 \end{vmatrix}$$

penalizes FNs 10 times more than FPs for a classifier. As will be explained below, the use of cost matrices improves analysis accuracy.

A list of pat wise triggering relations network events may also be used construct a triggering relation graph (TRG). The resulting TRG then serves as a source for locating anomalous network activities. The security model, which defines legitimate and abnormal events, comes in many forms when use for analyzing TRGs. Under the root-trigger security model, the legitimacy of a network event e based on the legitimacy of e's root trigger is determined, i.e., whether or not e has a legitimate root trigger. According to this definition, anomalous events are the events that do not have valid root trigger. These events may be due to malware activities or host/server misconfiguration. A specific root-trigger security definition is based on user intention, where a valid root trigger should be related to a user activity (e.g., as function call to retrieve user inputs, mouse clicks, or keyboard inputs). Other definitions for valid root triggers may be made according to the specific applications. Events that do not have any valid root triggers are vagabond events.

One method that may be used to enforce root-trigger security is a TRG CONSTRUCTION operation, which is used to calculate the discovered root triggers of all of the events. To find the root of each event by traversal in TRG is equivalent to the transitive reduction of a directed graph. Algorithm 2, set forth below, was designed as a root finding procedure (return to the root of an event, given all the pairwise triggering relations).

| Algorithm 2 Root Finding Algorithm (RFA) | |
| --- | --- |
| Input: as event $e_k$ and P* = {($e_i$ → $e_j$)}. | |
| Output: a set R, where each in R is a root of $e_k$. | |
| 1: | define a set R to store the results |
| 2: | define a queue Q and enqueue $e_k$ onto Q |
| 3: | while Q ≠ ∅ do |
| 4: |    event n ← dequeue Q |
| 5: |    set T ← find n's parent(s) based on P* |
| 6: |    for each event e ∈ T do |
| 7: |       if e is of type root then |
| 8: |          R ← R ∪ {e} |
| 9: |       else if e ∉ Q then |
| 10: |          enqueue e onto Q |
| 11: |       end if |
| 12: |    end for |
| 13: | end while |
| 14: | return R |

The input of Algorithm 2 is a set of all the pairwise triggering relations {($e_i$→$e_j$)} and an event $e_k$. The output is a set containing all the roots of $e_k$. In order to compute the transitive reduction of a directed graph, we use a queue Q to perform breadth-first traversal of TRG. For each iteration, the parent(s) T of a dequeued event n may be obtain. For each event e in the set T, the algorithm checks if it is a root-type event. If yes, then e is added to the return set roots. Otherwise (i.e., e is an intermediate node on the path from $e_k$'s root to $e_k$), the algorithm enqueues e onto Q for further iteration. This analysis returns root triggers for the network requests. Network requests without valid root triggers are labeled as vagabond events and are flagged and alerted to the administrator for further inspection. This methodology of a preferred embodiment may be used for detecting malware including, but not limited to, spyware as a browser extension, data-exfiltrating malware as a stand-alone process, and a DNS-based botnet command and control channel.

The pairwise accuracy rate of classification is the percentage of pairwise triggering relations that are predicted correctly. The pairwise accuracy is with respect to the ground truth obtained through rule-based analysis and manual classification. Conventional precision and recall measures evaluate the classification accuracy of the positives (i.e., the existence of triggering relations). In the equations below, TP, FP, and FN stand for true positives, false positives, and false negatives, respectively.

$$Precision = \frac{TP}{TP + FP},$$

$$Recall = \frac{TP}{TP + FN}.$$

The root-trigger correctness rate is computed based on the root of a node. It is the percentage of events whose roots in the constructed triggering relation graph are correct with respect to the ground truth.

An evaluation focusing on HTTP and DNS traffic was performed, because they are very commonly used communication protocol both by legitimate users and attackers. Many botnets use or HTTP or DNS as their communication protocol, because most firewalls allow them. Outbound HTTP and DNS requests from hosts were collected and analyzed, with the aim of detecting suspicious activities by stealthy malware installed on the hosts. In addition, the algorithms described were tested with a much larger TCP dataset collected from a server. A summary of the data is shown below in Table 4.

program. For Dataset II, DNS and HTTP, a tcpdump was used to continuously collect the outbound DNS queries and HTTP requests on an active user's workstation for 19 days. Type A/AAAA DNS queries and outbound HTTP requests that contain GET, HEAD, or POST information in their headers was collected. For Dataset III, server TCP traffic, TCP packets on an active Linux server in a research lab were collected. Inbound and outbound TCP packet headers were collected for 42 days using tcpdump.

Training data was labeled manually, with the use of simple rules such as discussed above. While the labeling process is time consuming, and requires nontrivial human efforts, the labeling of DNS traffic requires the integral analysis of user-HTTP dependency and DNS-HTTP dependency, details of which are omitted. User events are labeled as root triggers. User events were captured with a browser extension (Tlogger).

Three common classification techniques were compared: naive Bayes classifier, a Bayesian network, and a support vector machine (SVM). Due to the sparsity of triggering relations in network traffic, a cost matrix was defined that penalizes classifying false negatives more than classifying the false positives. CLASSIFICATION and TDG CONSTRUCTION operations were implemented in Java using the Weka library. Both 10-fold cross validation and train-n-test types of evaluation were performed. The two evaluation methodologies yield similar classification results.

Based on the two feature selection algorithms, 10 features out of as total of 12 were chosen for HTTP data. Selected features include three similarity indexes (RequestSim, ReferrerSim, HostSim), two nominal values to identify the file type (RequestType, ReferrerType), the nominal values to compare between particular attributes (PIDDiff, AddrDiff, Type-Match, IndexOfSameRequest), and time difference (TimeDiff). The results shown below in Table 5 show very good prediction accuracy for pairwise triggering relations under the cost matrix of

TABLE 4

An overview of datasets in the experiments. Number of events is the number of raw requests that have been collected. η is the reduction percentage after using an Efficient Pairing Algorithm. For Dataset I, the number of user events is also given in column 3.

| Data | Type | # of Events | η | # of Pairs | # of Features | Size (MB) |
|---|---|---|---|---|---|---|
| I | Host-based HTTP | HTTP: 45,988; User: 899 | 94.7% | 3,436,635 | 10 | 229.5 |
| II | Host-based DNS and HTTP | DNS: 35,882; HTTP: 85,223 | 98.8% | 953,916 | 9 | 55.1 |
| III | TCP Traffic of a Server | TCP: 3,010,821 | 99.6% | 119,372,631 | 9 | 6697.1 |

For the evaluation, η∈[0, 1] was defined as the reduction percentage in Equation (2), where EPA(n) is the number of event pairs after using the efficient pairing algorithm described above and n is the total number of events.

For Dataset I, HTTP, user events and outbound HTTP traffic in a user study with 20 participants was collected. Each participant was asked to actively surf the web for 30 minutes on a computer equipped with a data collection $$\begin{vmatrix} 0 & 1 \\ 10 & 0 \end{vmatrix}$$

which penalizes FNs 10 times more than FPs for a classifier.

TABLE 5

Pairwise classification results of train-n-test for three datasets. The numbers are rounded before reporting. Pairwise A. and Prec. stand for pairwise classification accuracy and precision, respectively.

| Data | # of Pairs in Test sets | Cost Matrix | Naïve Bayes | | | Bayesian Network | | | SVM | | |
|---|---|---|---|---|---|---|---|---|---|---|---|
| | | | Pairwise A | Prec. | Recall | Pairwise A | Prec. | Recall | Pairwise A | Prec. | Recall |
| I | 3,318,328 | $\begin{vmatrix} 0 & 1 \\ 10 & 0 \end{vmatrix}$ | 99.75% | 0.954 | 0.996 | 99.75% | 0.956 | 0.996 | 99.70% | 0.958 | 0.997 |
| II | 693,903 | $\begin{vmatrix} 0 & 1 \\ 1 & 0 \end{vmatrix}$ | 99.82% | 0.959 | 0.998 | 100.00% | 1.000 | 1.000 | 100.00% | 1.000 | 1.000 |
| III | 1,191,927K | $\begin{vmatrix} 0 & 1 \\ 3 & 0 \end{vmatrix}$ | 98.92% | 0.995 | 0.986 | 99.72% | 0.997 | 0.998 | 99.82% | 0.998 | 0.999 |
| Mean | — | — | 99.50% | 0.969 | 0.993 | 99.82% | 0.984 | 0.998 | 99.84% | 0.985 | 0.999 |

Figure 3A:
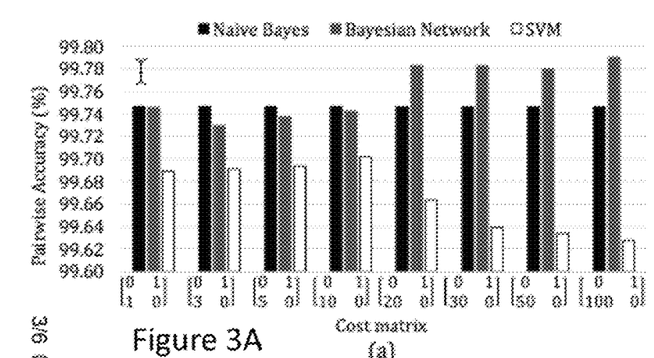
FIG. 3A shows the pairwise accuracy for Dataset I.

All classifiers give high precision and recall values, as well as the pairwise classification accuracy. These results indicate the effectiveness of a binary classification approach. The cost matrix used during the training was varied to compute the pairwise accuracy results of the three classifiers for Dataset I. The results are shown in FIG. 3A. The pairwise accuracy is consistently high for naive Bayes classifier with all cost matrices. Bayesian Network and SVM respond differently to the changes of penalty values in cost matrices.

Figure 3B:
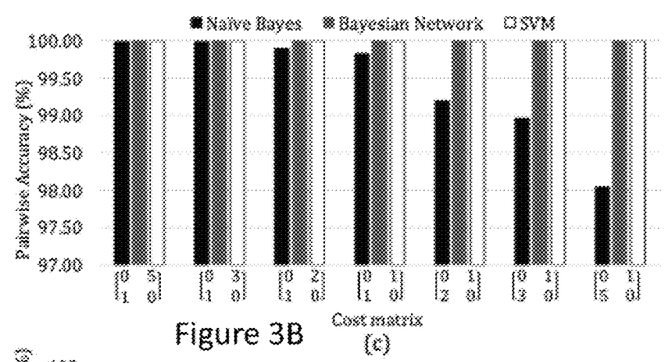
FIG. 3B shows the root-trigger correctness for Dataset I.

One purpose of the analysis was to identify reasons for wrong predictions of triggering relations. Running the root finding algorithm described above on the pairwise triggering relations, resulted in identifying the root triggers of all events which allowed them to be compared to the ground truth values. FIG. 3B shows the relationship between the cost matrix values and the accuracy of the root-trigger analysis. The naive Bayes and Bayesian networks yield nearly 100% accuracy for finding the root-triggers, both of which are not very sensitive to the cost matrices. In contrast, the accuracy of SVM increases significantly with an increased false negative penalty in the cost matrix, in Table 6 below, the results of root trigger correctness for Dataset I are summarize.

TABLE 6

Correctness of root triggers in Dataset I. Cases (a-g) refer to the various predicted root-trigger outcomes in FIG. 4.

| | Naïve Bayes | Bayesian Network | SVM |
|---|---|---|---|
| Cost Matrix | $\begin{vmatrix} 0 & 1 \\ 10 & 0 \end{vmatrix}$ | $\begin{vmatrix} 0 & 1 \\ 10 & 0 \end{vmatrix}$ | $\begin{vmatrix} 0 & 1 \\ 100 & 0 \end{vmatrix}$ |
| Correct (case a-c) | 99.94% | 99.94% | 99.37% |
| Wrong (case d-f) | 0.00% | 0.00% | 0.28% |
| Wrong (case g) | 0.06% | 0.06% | 0.35% |

As shown, the events' root triggers are accurate. It has a very small error rate, as low as 0.06%. These errors in finding root triggers generate false alerts. Wrong root triggers are mostly because of missing attributes in the original data or late-arriving requests.

To further evaluate the present invention, a proof-of-concept malicious Firefox extension was written, which is a piece of password-stealing spyware. The malware sends the username and password when a user clicks on the Submit button in the browser. This spyware is similar to the existing spyware such as FormSpy and FFsniff. A victim user clicks the Submit to log on to various email services and Internet forums. The spyware requests, which contain the username and password in the HTTP request (/query?id-user_id&ps=password), are sent to its destination host. All malicious HTTP requests were detected by all three classifiers, without triggering any FPs and FNs, by the causality analysis tool of the present invention.

In another effort to further evaluate the present invention, another proof-of-concept data-exfiltrating malware was written. This malware runs as a stand-alone process, similar to Pony bot. It sends out the HTTP GET/POST requests with system information to remote servers. The malware is programmed to transmit its payload right after the occurrence of a user's event on the host, attempting to hide its communication among legitimate outbound traffic. The malicious communication may be a single request or a series of HTTP requests. The present invention successfully detected the network activities of the malware in that the outbound malicious requests do not have valid triggering relations, i.e., the requests lack of any user's event as the root-trigger.

As described above, vagabond events are those that do not have any valid user events as their root triggers. For Dataset I, there are a total of 1.2%. Some of them are malicious traffic to known blacklisted websites. The analysis found in Dataset I that among these vagabond events, there are 169 suspicious requests sent to 36 distinct domains. Manual inspection reveals that these requests are to tracking sites, malware-hosting or blacklisted sites, and aggressive adware. They are partly due to users visiting compromised web sites. For example, some requests track the user's cookies and send back to remote hosts with known blacklisted sites (e.g., 2o7.net, imrworldwide.com, me-diaplex.com). The geographic locations of the malicious servers based on their IP addresses were analyzed; all of them were located in the US, except one IP located in the Netherlands.

False alerts refer to the network requests that are vagabond requests (i.e., requests without proper triggers), but are legitimate (benign). False alerts found in Dataset I are due to a number of factors such as automatic and periodic system and application updates that occur without user triggers. In Dataset I there are 157 update requests that are sent to 13 well-known legitimate domains. Whitelisting can be used to eliminate these alerts.

Another cause of false alerts is missing or incomplete attributes in the original data due to server configuration, e.g., redirection without properly setting the referrer field. There are 244 misconfigured requests that were sent to 38 different domains, usually image/video hosting websites.

Another cause is that unconventional attribute values, e.g., requests to googlesyndication.com (for Google Map) have long referrers that were not expected. Lastly, requests sent out much later than their parent request trigger, e.g., requests for favorites or bookmark icons.

For Dataset II, the goal was to find the triggering relation in traffic with mixed types, such as DNS and HTTP requests. Features used for classification are given in Table 9 below.

Figure 3C:
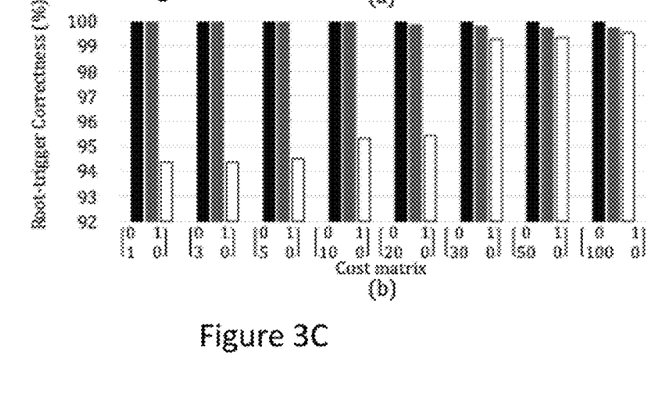
FIG. 3C shows the pairwise accuracy for Dataset II.

The pairwise classification results on Dataset II are presented in Table 5. All three methods give high pairwise classification accuracy. This demonstrates an ability to discover triggering relations in mixed traffic types. Bayesian network and SVM yield better results than a naive Bayes classifier, indicating that there are dependencies among attributes. The pairwise classification accuracy under various cost matrices is shown in FIG. 3C. Bayesian network and SVM consistently give high classification accuracy. In contrast, the performance of a naive Bayes classifier decreases, as the cost matrix penalizes FNs more than FPs. The pairwise classification accuracy results under the cost matrix of $$\begin{vmatrix} 0 & 1 \\ 1 & 0 \end{vmatrix}$$

are shown in Table 5.

Figure 3D:
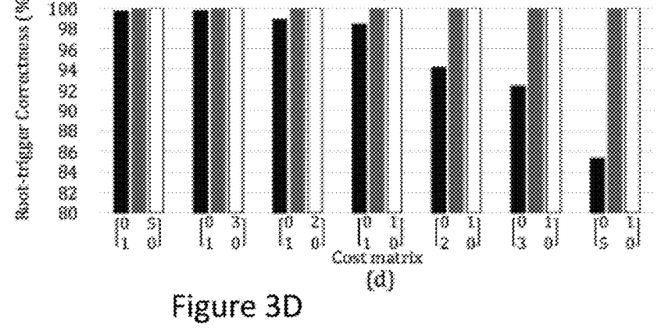
FIG. 3D shows the root-trigger correctness for Dataset I.

The root-trigger accuracy for Dataset II were analyzed and the results are shown in FIG. 3D. The root-trigger accuracy is high when using all three classifiers, with Bayesian network and SVM outperforming the naive Bayes. The pairwise classification accuracy results under the cost matrix of $$\begin{vmatrix} 0 & 1 \\ 1 & 0 \end{vmatrix}$$

are shown below in Table 7.

TABLE 7

Root-trigger results on Dataset II. Cases (a-g) refer to the various predicted root-trigger outcomes in FIG. 4.

|  | Naïve Bayes | Bayesian Network | SVM |
| --- | --- | --- | --- |
| Cost Matrix | $\begin{vmatrix} 0 & 1 \\ 1 & 0 \end{vmatrix}$ | $\begin{vmatrix} 0 & 1 \\ 1 & 0 \end{vmatrix}$ | $\begin{vmatrix} 0 & 1 \\ 1 & 0 \end{vmatrix}$ |
| Correct (case a-c) | 98.44% | 100.00% | 100.00% |
| Wrong (case d-f) | 1.37% | 0.00% | 0.00% |
| Wrong (case g) | 0.19% | 0.00% | 0.00% |

Botnet command and control channel using DNS tunneling is extremely stealthy and difficult to detect. A proof-of-concept bot that communicates with its bot master by tunneling command and control messages in DNS traffic was used. The bot generates carefully crafted outbound DNS queries whose payload contains encoded data e.g., NBSWY3DPFQQHO33SNRSA000.domain.com, dIjs22szq85hyn.cloudfront.net. These bot queries are mixed with a 2-hour DNS-HTTP traffic dataset, which was then analyzed by the causality tool. Evaluation confirms that the methods of the invention successfully recognize all the loot DNS queries as anomalies. These DNS queries do not have the valid user-event root triggers.

Dataset III was used to find the triggering relation between inbound and outbound TCP packets by using the machine learning method. The accuracy results of pairwise triggering relation are shown in Table 5. All three classifications yield high values for the pairwise classification accuracy, with Bayesian network and SVM outperforming a naive Bayes classifier. The features used for classification are shown below in Table 10.

In addition, the methods produce high pairwise classification accuracy and root trigger correctness. Of particular significance are Bayesian Network and SVM, which yield the precision and recall of 1.0, a 100% pairwise classification accuracy, and a 100% root-trigger correctness for Dataset II.

Precision values are slightly lower than recall values in general, indicating more false positives than false negatives in the classification results. The reason for slightly lower precision values is partly due to the customized penalty weights in the cost matrix. Runtime results are obtained on a machine with Intel Duo Processor E8400, 3 GB RAM and 250 GB HDD. For each dataset, the runtime of pairing, training, classification, and find-root operations were reported. The means reported in Table 8 below are averaged from five runs. Standard deviations are negligible and not shown.

TABLE 8

Averaged performance (in seconds) of Pairing, Train, Classification, and Find-root operations. NB and BN stand for Naive Bayes and Bayesian Network classifiers, respectively. Pairing time includes feature extraction.

|  |  | Train | | | Classify | | | Find |
| --- | --- | --- | --- | --- | --- | --- | --- | --- |
| Data | Pair | NB | BN | SVM | NB | BN | SVM | Root |
| I | 1848 | 0.5 | 1.2 | 79.9 | 22.7 | 16.8 | 14.2 | 1.7 |
| II | 622 | 0.8 | 2.1 | 13.4 | 4.0 | 2.2 | 2.1 | 0.6 |
| III | 14686 | 2.6 | 7.9 | 546 | 431 | 411 | 446 | — |

According to Table 8, the PAIRING operation is the most time-consuming task. For example, it takes about 4 hours to generate the pairs from 3 million TCP messages (42-day TCP data of a server). The train, classification, and root-finding operations are fast.

Bayesian networks provide the best analysis accuracy for all datasets. The naive Bayes classifier gives the lowest accuracy, indicating the existence of dependencies in pair wise features. The accuracy can be improved by strategically defining the cost matrix. Precision and recall metrics are more sensitive to the quality of the classification results than the pairwise accuracy metric. The fundamental reason for this difference is the sparsity of the triggering relations, which results in different sizes of the denominators in these metrics. Causality analysis reveals that all the outbound traffic to 36 malicious domains, i.e., with a zero false negative rate. The invention also detects the stealthy network activities as shown by the proof-of-concept browser spyware, DNS bot, and stand-alone data-exfiltrating malware.

In another embodiment, the present invention provides a traffic-reasoning technique for detecting the network activities of stealthy malware. The technique explores request-level traffic structures and semantic triggering relations. It had been demonstrated that the use of triggering relation discovery is a useful security analysis approach, and is effective against browser spyware, DNS bot, and data exfiltrating malware. An evaluation demonstrates the high accuracy of the triggering relation prediction. Another analysis identified several types of network anomalies caused by traffic to malicious servers or misconfigured servers.

As discussed above, possible features that may be used for classification are shown below in Tables 9 (for Dataset II) and 10 (for Dataset III).

TABLE 9

Feature ranking by InfoGain (IG) and GainRatio (GR) Selection on Dataset II. Denote DNS and HTTP requests as A and B, and define Dom(URL) to get the domain of a URL.

| Feature | Rank IG | Rank GR | Brief Definition |
| --- | --- | --- | --- |
| HTTPRank | 1 | 1 | Rank of B in HTTP. |
| QueryHostSim | 2 | 2 | Sim(A.query, B.host). |
| QueryDomainSim | 3 | 3 | Sim(A.query, Dom(B.host)). |
| TimeDiff | 4 | 4 | Time difference (ms). |
| QueryRefSim | 5 | 7 | Sim(A.query, Dom(B.ref)). |
| MissingRef | 6 | 5 | If B.ref is null. |
| HTTPType | 7 | 6 | If B is IPv4 or IPv6 |
| DuplicatedDNS | 8 | 8 | # of same DNS after A. |
| PIDDiff | 9 | 9 | If both PIDs are equal. |

TABLE 10

Feature ranking by InfoGain (IG) and GainRatio (GR) Selection on Dataset III. Two TCP packets are A and B, which B follows A.

| Feature | Rank IG | Rank GR | Brief Definition |
| --- | --- | --- | --- |
| DiffAck2Seq1 | 1 | 2 | Calculate B.ack-A.seq. |
| ExpectedAck | 2 | 1 | If B.ack = A.seq + A.len. |
| TimeDiff | 3 | 7 | Time difference (ms). |
| Flag1 | 4 | 3 | Control bits in A. |
| Len1Zero | 5 | 5 | If A.len is 0. |
| Len1Large | 6 | 4 | If A. len ≥ MSS. |
| MatchAck1Seq2 | 7 | 8 | If A.ack = B.seq. |
| Flag2 | 8 | 9 | Control bits in B. |
| MissingAck1 | 9 | 6 | If A.ack is null. |

Figure 5:
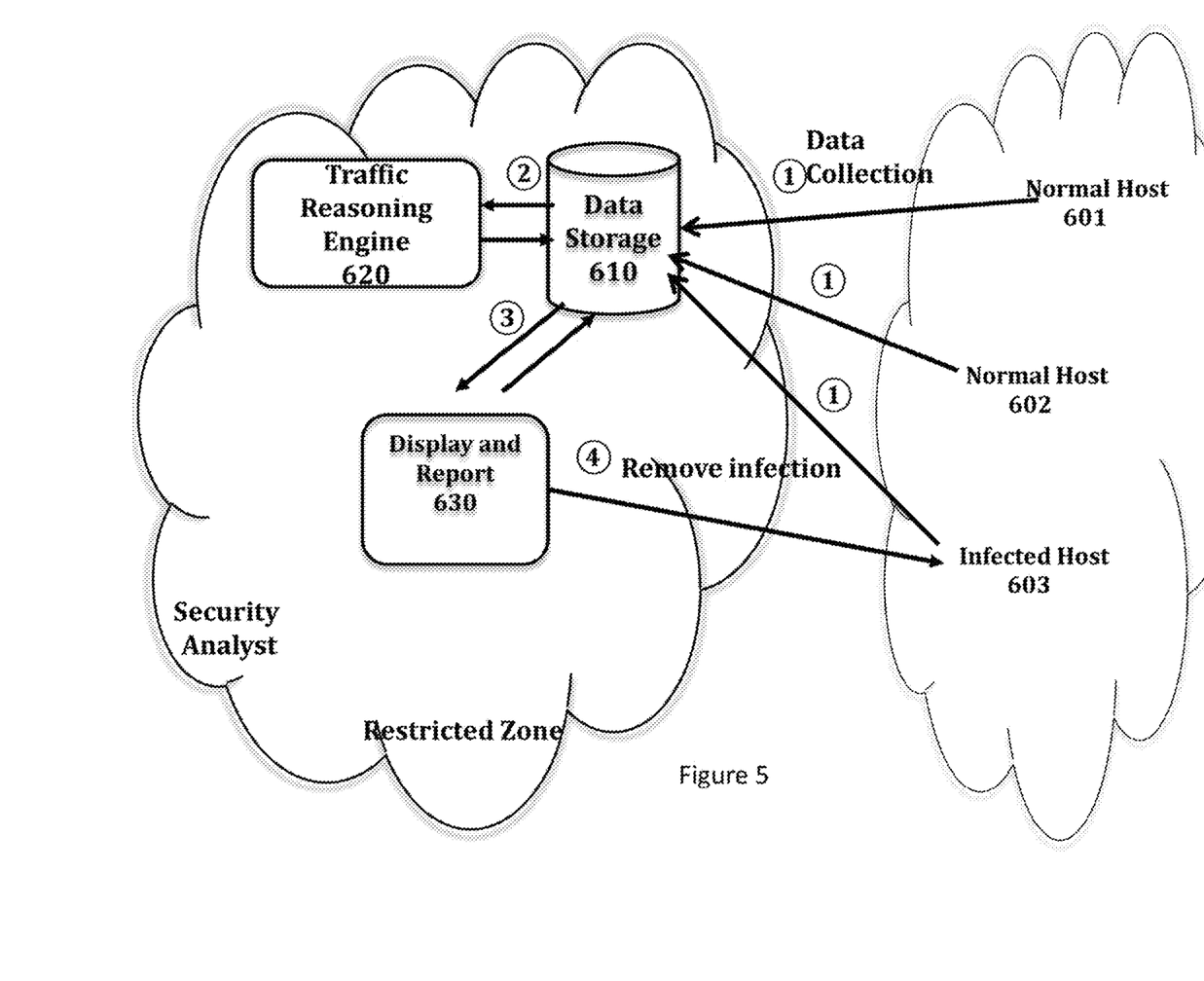
FIG. 5 depicts a workflow for one embodiment of the invention.

FIG. 5 depicts a workflow for one embodiment of the invention that uses a computer system to distinguishing user-initiated network traffic from malware-initiated network traffic. The system uses at least at least one central processing unit (CPU), not shown, and has at least one memory or data storage 610 communicatively coupled to the CPU. The memory uses a program code executable by the CPU to monitor a plurality of individual network events of devices 601-603 and stores the data 610. The data is processed by traffic reasoning engine 620 to determine, for an individual network event, whether the event has a legitimate root-trigger as described above. The system then identifies malware-initiated traffic as an individual network event that does not have a legitimate root-trigger, which may be identified in a desired display and or report 630 and removed.

Figure 6:
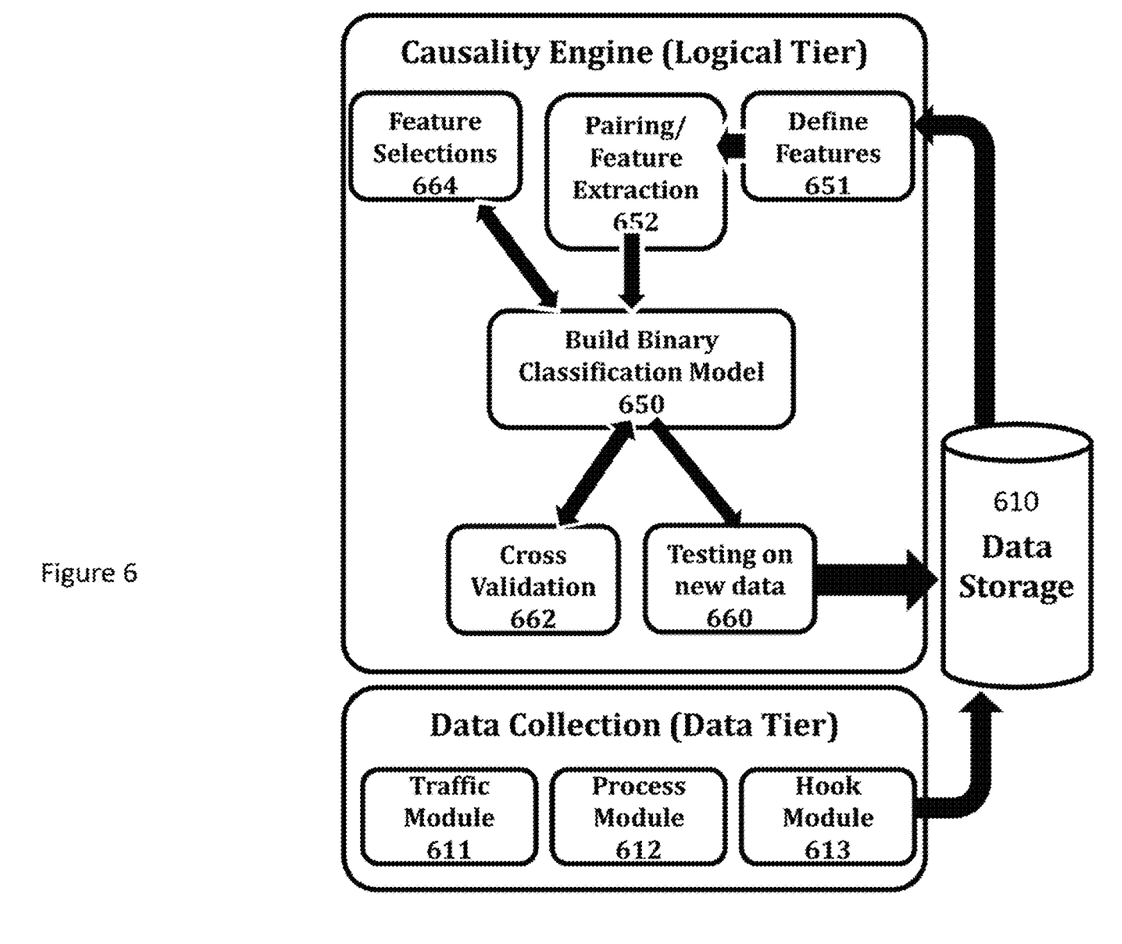
FIG. 6 depicts a workflow for one embodiment of the causality engine of the invention.

FIG. 6 depicts a workflow for one embodiment of the causality engine of the invention to build binary classification model 650. For network data including individual network events, which may be obtained from one or more traffic modules 611, process modules 612 and or hook modules 613, pairwise features are defined 651 as set forth above. A pairing operation 652 is performed for extracting pairwise comparison results (i.e., features) of events attributes as described above. One or more binary classification algorithms may be used for classification 650. As described above, the classification uses labeled pairs for training, where triggering relations among events (i.e., labels) are known. Testing 660 of the model is performed as also described above for the various embodiments. Cross validation 662 and feature selection 664 may also be performed as described above.

What is claimed is:

1. A computer system for distinguishing user-initiated network traffic from malware-initiated network traffic, the system comprising:
    at least one central processing unit (CPU);
    memory communicatively coupled to the CPU, the memory comprising program code executable by said at least one CPU to perform the following steps:
    monitoring a plurality of unknown individual network events and identifying a traffic dependency among them, said dependency used to detect anomalies by confirming the legitimacy of the mot-trigger events;
    converting a plurality of individual network events and a plurality of root-trigger events into a plurality of event pairs with comparable pairwise attributes, said pairwise attributes comprising one of the following: similarities in event's time stamps, domain names, host names, IP addresses, process IDs (PID), HTTP request's referral fields, network requests types, network requests content, network requests flags, to determine if there is a parent-child relationship between said one network event and one of its subsequent events wherein said root-trigger events are said parent, said individual network events are said child and said parent and said child are not identical;
    said parent-child relationships between said individual network events and said root-trigger events are unknown when said individual network events and said root-trigger events are converted into event pairs;
    determining for an individual child network event whether said individual child event has a legitimate parent root-trigger event; and
    identifying malware-initiated traffic as an individual network event that does not have a legitimate parent root-trigger event.

2. The system of claim 1 wherein said system uses a pairing algorithm to extract the pairwise features and conduct learning classifiers to identify the dependency.

3. The system of claim 2 wherein said the machine learning classifier is a binary classification method.

4. The system of claim 1 wherein said the pairing algorithm includes a dictionary comprised of key-value pairs used to store a current network event,
    wherein said key of said dictionary is the domain attribute of an event and said value is a set of requests, whose domain attribute is the same as said key; and
    an event with an unmatched key value is filtered out.

5. The system of claim 1 wherein a feature extraction method is used to transform two individual network events into comparable pairwise attributes which are processed by learning algorithms.

6. The system of claim 5 wherein a binary classification method is used to discover whether a triggering relation exists in an event pair or not.

7. The system of claim 1 wherein a triggering relation graph is used to identify events that do not have any valid root triggers events.

8. The system of claim 7 wherein said triggering relation graph is used to detect anomalous or malicious network activities.

9. The system of claim 1 wherein one or more cost matrices are defined to penalize missed parent-child relationships.

10. The system of claim 9 wherein said one or more cost matrices are defined to weigh false positives and false negatives differently.

11. The system of claim 10 wherein said one or more cost matrices are defined to penalize false negatives 10 times more than false positives.

12. The system of claim 1 wherein malware-initiated traffic is identified as an individual network event that does not have a legitimate parent root-trigger by iteratively pairing an individual child network event with a plurality of parent root-trigger events.

13. The system of claim 1 wherein said system uses a pairing algorithm to extract the pairwise features, then applies pre-defined rules to identify the parent-child relationships of new events based on their pairwise features.

14. A method for creating a model to detect malware comprising the steps of:
obtaining network data comprising individual network events and root-trigger events, wherein said root-trigger events are user input events that occur prior in time to said individual network events;
performing a pairing operation on two or more of said individual network events and at least one said root-trigger events to transform said individual network events and said root-trigger events into event pairings having comparable pairwise attributes, said pairwise attributes comprising a one-parent-multiple-children relationship between said root-trigger events and said two or more individual network events, wherein said root-trigger events are said parent, said individual network events are said children and said parent and said children are not identical;
said individual network events and said root-trigger events are unknown when said individual network events and said root-trigger events are converted into event pairings; and
said parent-child relationships or other lineage relationships between said individual network events and said root-trigger events are unknown when said individual network events and said root-trigger events are converted into event pairings;
building a classification model that is used to identify malware-initiated traffic as an individual network event that does not have a legitimate root-trigger event.

15. The method of claim 14 wherein one or more binary classification algorithms are used.

16. The method of claim 14 wherein a root-trigger event is paired with a first network event and said first network event is paired with a second network event.

17. The method of claim 1 wherein said parent and said children form a branch.

18. The method of claim 14 wherein said parent and children form a chain.

19. The method of claim 14 wherein said parent and children form a chain comprised of a grandparent-parent-child relationship.

* * * * *